United States Patent Office 3,507,896
Patented Apr. 21, 1970

3,507,896
METHOD OF MAKING ALCOHOL-SOLUBLE COMPLEXES OF ALUMINUM
John L. Jones, North Plainfield, and Andrew M. Rubino, New Providence, N.J., assignors to Armour Pharmaceutical Company, Chicago, Ill., a corporation of Delaware
No Drawing. Continuation-in-part of application Ser. No. 603,133, Dec. 20, 1966, which is a continuation-in-part of application Ser. No. 472,684, July 16, 1965. This application Oct. 23, 1968, Ser. No. 770,103
The portion of the term of the patent subsequent to Jan. 7, 1986, has been disclaimed
Int. Cl. C07f 5/06
U.S. Cl. 260—448  10 Claims

ABSTRACT OF THE DISCLOSURE

Alcohol-soluble complexes of aluminum are prepared by reacting aluminum powder and polyhydroxy compound in water, with either hydrochloric acid or aluminum chloride present, and then drying the resultant complex to form the alcohol-soluble aluminum complex.

---

The present invention is directed to a method of making alcohol-soluble complexes of aluminum.

This application is a continuation-in-part of our patent application Ser. No. 603,133 filed Dec. 20, 1966 and now U.S. Patent No. 3,420,932. Ser. No. 603,133 was a continuation-in-part patent application of Ser. No. 472,684 filed July 16, 1965 and now abandoned.

In the patent application Ser. No. 603,133, basic aluminum chloride (sometimes referred to as aluminum basic chloride, or aluminum chlorhydroxide) is reacted in an aqueous solution with a polyhydroxy compound, having at least two carbon atoms, each of which is linked to a hydroxy group, following which the complex is dried to a product containing between about 1.0 to about 10 weight percent of water determined by Karl Fischer analysis.

The alcohol-soluble complexes of aluminum prepared by the method of patent application Ser. No. 603,133 are superb antiperspirants. In particular, they are markedly suitable for use in Aerosol dispensers. Thus their low water content, solubility in anhydrous alcohol, and compatibility with conventional Aerosol propellants, namely halogenated (fluoro chloro) hydrocarbons, has permitted them to be dispensed from low cost conventional metal Aerosol dispensers without excessive corrosion or valve clogging problems.

The basic aluminum chloride used in the method of patent application Ser. No. 603,133 is a relatively costly material, when compared to aluminum powder, or aluminum chloride.

This invention has as an object the provision of a relatively low cost method of making alcohol-soluble complexes of aluminum of the type disclosed in patent application Ser. No. 603,133.

This invention has as another object the provision of a low cost method of making alcohol-soluble complexes of aluminum using aluminum powder or ingots and hydrochloric acid or aluminum chloride.

Other objects will appear hereinafter.

The preferred coordination compounds (complexes) of the present invention have the formula:

$$Al_2(H_2O)_{y-pz}(OH)_{6-nx}Cl_n(R)_p$$

wherein R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

The aforesaid formula should not be interpreted as meaning that only water is displaced by R, since R could also displace any OH which are bound to the aluminum atoms. This could also occur, inter alia, by virtue of the condensation of the polyol hydroxy groups with the hydroxy groups bonded to the aluminum atoms. Where more than one hydroxy group of a given polyol molecule condenses with the hydroxy groups bonded to aluminum, chelate structures may be formed. Still other mechanisms can be postulated.

The optimum coordination compounds (complexes) of the present invention have the formula:

$$Al_2(H_2O)_{0.7-1.1}(OH)_{4.9-5.1}(Cl)_{0.9-1.1}(1,2 \text{ Propylene Glycol})_{0.7-1.3}$$

In the above formula, the 1,2 propylene glycol may be present in the complex in a number of ways, namely with both carbinol hydrogen atoms being lost by condensation or neutralization, or with only one carbinol hydrogen atom being lost by condensation or neutralization, or with both hydroxy groups remaining intact and coordinated and/or chelated to one of the aluminum atoms.

Suitable polyhydroxy compounds for use in the practice of the present invention include: propylene glycol; 1,1,1-trimethylol propane; 1,3-butylene glycol (1,3-butane-diol); glycerine (1,2,3-trihydroxy propane); 2-methyl-2,4-pentane-diol; neopentyl glycol (2,2-dimethyl-1,3-dihydroxy pentane); and butyne-1,4 diol.

The preferred polyhydroxy compound is 1,2-propylene glycol. In addition, we have obtained superior products with 1,3-butane diol, and with trimethylol propane.

In the subject invention, aluminum chloride, polyhydroxy compound, and aluminum metal are reacted at a temperature of 75° C. to 110° C. in water, followed by filtering the mixture and the removal of water from the filtrate to form the complex; or in the alternative, aluminum metal, polyhydroxy compound and aqueous hydrochloric acid are reacted at a temperature of 75° C. to 110° C., followed by filtering the mixture and the removal of water from the filtrate to form the complex.

The reaction (regardless of which of the two set forth above is used) should always go forward in the presence of some water. Thus, aluminum chloride is soluble in anhydrous ethanol. Attempts to form the aluminum complexes of the present invention were unsuccessful when aluminum powder was added to anhydrous aluminum chloride and anhydrous ethanol. Thus, a slurry would result, which slurry is believed to be the relatively insoluble aluminum ethoxide. The presence of a polyhydroxy compound of the type set forth above, such as propylene glycol, had no apparent affect on this reaction. However, the presence of water, preferably a small excess of water, permits the reaction to proceed without the formation of solids. The water present in the reaction mixture may be added as such, or may be part of the aluminum chloride, such as its hexahydrate.

Aqueous alcoholic solutions, such as a 90 weight percent ethanol and 10 weight percent water mixture can be used to effect the reaction if an alcoholic solution of the complex is desired as the final product, since no drying, or minimal drying, of the filtered material may prove necessary.

In an aqueous system, aluminum metal will react with hydrochloric acid to form aluminum chloride. If an excess of the metal is present, the reaction will continue forming basic aluminum chlorides [Al(OH)Cl$_2$, Al(OH)$_2$Cl, Al$_2$(OH)$_5$Cl] and eventually some aluminum hydroxide. In order to prevent an unnatural decomposition of the basic complexes, water molecules should be associated with aluminum such that the total number of ions and water bound to each aluminum is at least six (i.e. $Al_2(OH)_5Cl \cdot 2—4H_2O$, assuming —OH groups to be partially shared).

In preparing the alcohol soluble complexes directly, it is preferable to have the glycol present in the medium prior to formation of the basic aluminum chloride. This seems to prevent excessive polymerization and exposes more coordinated water sites to be displaced by the glycols.

The reaction should be conetinued until the aluminum to chlorine atomic ratio is between 1.82 and 2.22 or optimally between 1.88 and 1.95. The reaction should also be continued until the ratio of aluminum to glycol in the product is between about 1.5 and 2.8.

The optimum reaction temperature is a variable depending on the type of finished product desired. Thus, if it is intended to produce an alcoholic solution of the aluminum complex, it would be advanetageous to carry out the reaction in a nearly anhydrous alcoholic medium. In this case, the optimum reaction temperature would be about 80° C. However, if it is intended to produce a solid alcohol soluble complex, it would be more advanteageous to carry out the reaction in an aqueous medium and oper ate at about 90°–110° C.

The coordination compounds of the present invention may be dried by spray drying or by vacuum drying to a product containing between about 1 and 10 weight percent of moisture as determined by the Karl Fischer assay method.

The spray drying temperatures to be used in the process of the present invention will vary depending on the size of the spray drier. With the Bowen No. 2 7-foot diameter spray drier and larger, an inlet temperature of 200° to 320° C. can be used, with the preferred inlet temperature being about 225° to 270° C. An outlet temperature range of 100° C. to 160° C. should be used. For laboratory size spray driers, such as a Bowen Flat-Bottom laboratory spray drier (30-inch diameter) an inlet temperature range of the order of 90° C. to 260° may be used, with a preferred inlet temperature range of 150° C. to 210° C. With such small size spray driers, an outlet temperature within the range of 80 to 125° C. may be used, with the preferred outlet temperature range being between 100° C. and 120° C.

It has been found that the spray dried product should be cooled as rapidly as possible to a temperature of 50° C. or less.

One system, which has been proven successful, consists of an air conveying system. Product is removed from the drier waste gas stream through a rotary lock valve. The product at a temperature of approximately 100° to 160° C. is dropped into an air stream, cooled and conveyed to a final collection point. The conveying air is ambient air that has been cooled to less than 45° F. maximum by a refrigeration system. At the cold temperature, the air is saturated with water vapor. In the process of cooling the hot product, the air is naturally warmed to 70–80° F. with no additional water being added to the air since no additional product drying is occurring. The resultant relative humidity of the air is less than 40%. Any ambient air temperature below 45° F. is advantageous to the lower relateive humidity after being heated. The temperature of the final product is dependenet upon the air flow rate. A flow rate of approximately 10% of the total drier air flow rate cools the product to 80° F. with a 45° F. inlet temperature. If the spray dried product is not cooled as rapidly as possible, then deterioration sets in, and in particular, impaired solubility in anhydrous alcohol, and reduced compatibility with Aerosol propellants, such as fluorohydrocarbons results.

In connection with vacuum drying, such vacuum drying should be achieved at a temperature of 65° to 120° C., a vacuum of the order of 7 millimeters of mercury up to atmospheric pressure, and a drying time of 1 hour to 100 hours. When all of the water has been removed, further heating may produce decomposition (this will vary depending on the complex and on the temperature). Examples of vacuum, temperature and time include a vacuum of 7 millimeters mercury, a temperature of 70° C. and a drying time of 1 hour; and a vacuum of 25 millimeters of mercury, a temperature of 90° to 95° C. and a drying time of 5 hours. The more rapid the drying, under the lowest pressures gives a more soluble in anhydrous alcohol and more compatible product.

Spray drying is normally superior to vacuum drying, although the more rapid vacuum drying approaches the results obtained by spray drying.

As above-indicated the range of water as determined by the Karl Fischer assay method in the final product should be of the order of 1 to 10 weight percent. Preferably, it should be of the order of about 4½ to 8%, with about 6 weight percent being optimum.

In cases where the polyhydroxy compound is relatively volatile, an excess of polyhydroxy compound should be used to prepare the coordination compounds of the present inventeion, since a significant amount of polyhydroxy compound is lost by evaporation (such evaporated polyhydroxy compound can be recovered by condensation). The evaporation of the polyhydroxy compound occurs during refluxing, although where spray drying forms the drying method, a major portion of the evaporated polyhydroxy compound is lost during the spray drying. With spray dried coordination compounds of the present invention, depending on the volatility of the polyhydroxy compound and the conditions of spray drying, as much as on the order of 30 to 50 weight percent of the initial amount of the polyhydroxy compound is lost on evaporation. For this reason, where evaporation of glycol is encountered, it is necessary to start off with an excess amount of glycol, since if the stoichiometric amount of glycol is used initially, the correct ratio of glycol to aluminum will not be achieved in the final product. During spray drying, glycol and water are the only materials being removed. Thus, for example, we can commence with a ratio of 0.95 mols of aluminum per mol of propylene glycol and get a final product which contains a ratio of about 2 mols of aluminum per mol of propylene glycol after spray drying.

The complex (that is, the "dry" product) exhibits antiperspirant properties which compare favorable by subjective evaluation to aluminum chlorohydroxide. This erect is believed to result from our retention of the ionicity of the aluminum in our complex.

While the exact mechanism of the reaction is not fully understood, it is believed to involve the displacement of free and bound water and, possibly, a displacement or condensation with hydroxy groups attached to the aluminum ion. The hydroxy groups of the polyhydroxy compound appear to be unreactive with the chloride ion.

The following illustrate the preparation of alcohol-soluble complexes of aluminum in accordance with the present invention:

Example 1

To a heated, agitated mixture of 500 g. 32° Bé. aluminum chloride, 533 g. propylene glycol and 765 ml. water, reacted a total of 139 g. of aluminum powder over a period of about 5 hours and a temperature of 90–100° C. The reaction product was allowed to concentrate by further heating to about 1575 g. net weight and an additional 5.0 g. of aluminum added. When the reaction became vigorous, the mass was filtered to yield a clear aqueous solution having a viscosity of about 188 cp.

The concentrate was spray dried through a Bowen Flat-Bottom spray dryer (30-inch diameter) at an inlet temperature of 405° F. and an outlet temperature of about 245° F. The product was rapidly soluble to the extent of at least 30% in anhydrous ethanol.

Assay: 19.8% aluminum, 13.6% chloride, 6.6% $H_2O$ (Karl Fischer).

Example 2

In a 4 liter beaker equipped with an agitator, a heater and a condenser was added 1220 g. of deionized water, 578 g. of 20° Bé.HCl, and 780 g. of reagent grade propylene glycol. Simultaneously, heat was applied and 5-10 g. increments of aluminum powder added until the heat of reaction caused the temperature to increase to about 90° C. Heating was discontinued and aluminum powder added at such a rate that the reaction temperature was maintained at 90-95° C. After a total of 260 g. of aluminum was added, the condenser was removed and the reactants allowed to concentrate with continual heating at 95-100° C. to a net weight of 2225 g. Maintaining a constant net weight and temperature, the reaction was continued until a pH (ambient) of 3.45 was obtained for a total reaction time of 3.5 hours. At this point, 10 g. of aluminum powder was added, the reaction continued for 15 minutes and the mixture filtered to yield a clear solution having a specific gravity of 1.313 and a viscosity of 196 cps.

The solution was spray dried in a Bowen Laboratory Dryer at an outlet temperature of about 245° F. to yield a powder which was rapidly soluble in anhydrous ethanol.

Assay: 19.7% Al, 13.4% Cl, 7.6% $H_2O$ (by Karl Fischer).

Example 3

To 276.5 g. of absolute ethanol was added 32.5 g. of water and 13.33 g. of anhydrous aluminum chloride. This was heated to reflux at about 70° C. 30.4 g. propylene glycol was added. Then 13.5 g. of aluminum powder was added and the mixture heated to reflux for 22 hours. A few milligrams of mercury bichloride were added (to catalyze the reactivity of aluminum), and the reflux was continued for an additional 2 hours. The hot solution was then filtered. 303 g. of solution was collected including a few ml. of wash alcohol, and 6 g. of unreacted aluminum. The resultant solution contained 2.9 weight percent Al and 3.4 weight percent Cl for an aluminum to chlorine ratio of 1.13 to 1.

The resultant solution could be spray dried, as by the spray drying conditions set forth in Example 1 to yield an aluminum complex, which is soluble in anhydrous alcohol and compatible with aerosol propellants.

Example 4

24.15 g. of $AlCl_3 \cdot 6H_2O$ were dissolved in 276.5 g. of absolute ethanol. 30.4 g. of propylene glycol and 21.6 g. of water were added. Then 94.5 g. of mercury amalgamated aluminum pellets were added. The mixture was refluxed for 48 hours. The solution was filtered, and the precipitate washed with distilled water. About 576 g. of solution was collected (including wash water) and about 82.8 g. of unreacted aluminum pellets. The solution contained 2.4 weight percent Al and 1.73 weight percent Cl for an aluminum to chlorine ratio of 1.83 to 1.

The solution can be dried, as by the spray drying method of Example 1, to yield an aluminum complex which is soluble in anhydrous alcohol, and which is compatible with aerosol propellants.

Example 5

In a 4 liter beaker equipped with agitation, heating and a condenser and containing 1220 g. of deionized water and 580 g. of 20° Bé. HCl was dissolved 645 g. of Celanese reagent grade trimethylol propane. To the mixture was added 260 g. of aluminum powder in 5-10 g. increments at such a rate that the temperature (due to heat of reaction) increased to and was maintained at 95-100° C. After the addition of aluminum was complete, heat was applied and the mixture allowed to concentrate to a net weight of 2090 g. and then maintained at this concentration and 95-100° C. After a total reaction time of 4.5 hours, the pH (ambient) reached 3.48 and an additional 10 g. of aluminum powder was added. After 0.25 hour, the solution was filtered to yield a water-white liquid having a viscosity of 70 cps. The solution was further concentrated with heating until the viscosity reached 158 cps.

The solution was spray dried in a Bowen Laboratory Dryer at an outlet temperature 245° F. to yield a powder rapidly soluble in anhydrous ethanol.

Assay: 18.2% Al, 12.14% Cl, 6.4% $H_2O$ (by Karl Fischer).

Example 6

Into a 500 gallon reactor equipped with agitation and a heat exchanger was charged 2150 pounds of 23.6° Bé. aluminum chloride solution (4.2% Al, 16.3% Cl) and 1540 pounds of water. The agitated solution was heated to 83° C. and 45 pounds of aluminum powder added in several increments. The reaction proceeded for 0.25 hour and then 1520 pounds of U.S.P. propylene glycol added over a period of 1.2 hours. While maintaining a temperature of 90°+3° C., aluminum powder was added simultaneously in 20 pound increments every 10-15 minutes until an overall total of 415 pounds had been added. The reaction was continued until nearly all of the aluminum had dissolved (total time from initial addition of aluminum was 6.25 hours). Then 40 pounds of aluminum powder was added, allowed to react for 0.3 hour and the total reaction mass filtered to give a clear viscous solution assaying: 11.13% Al, 7.60% Cl, 30.4% propylene glycol, 30 p.p.m. Fe and 1.32 Sp. G. Suitable experimental quantities of the above concentrate were spray dried through a Bowen No. 2, 7-foot diameter, spray dryer at various temperatures. The following represent the range of products obtained at various drying temperatures.

| | Percent Al | Percent Cl | Percent $H_2O$ | Propylene Glycol, Percent | Solubility in Anh. Ethanol, Percent | $CCl_4$ [1] Compatibility, cc. |
|---|---|---|---|---|---|---|
| Outlet, ° F.: | | | | | | |
| 270 | 20.4 | 14.1 | 7.8 | 30.6 | >50 | 215 |
| 275 | 20.5 | 14.0 | 7.0 | 31.9 | >50 | 204 |
| 285 | 20.0 | 13.8 | 6.8 | 32.0 | >50 | 194 |

[1] Defined as the number of cc.'s of carbon tetrachloride to effect a permanent cloudiness to 60 g. of a 30% solution of the product in anhydrous ethanol, a measure of compatibility with aerosol propellants, e.g. fluoro (chloro) hydrocarbons.

Example 7

The aluminum complex prepared by Example 6 was used in the following formulation:

| Component | Parts by weight |
|---|---|
| Aluminum complex | 7 |
| Hexadecyl alcohol | 3 |
| Silicone fluid 1066 (General Electric) | 1 |
| Stearic acid (triple pressed) | 1 |
| S.D. 40 anhydrous alcohol | 37.75 |
| Perfume | 0.25 |
| Dichlorotetrafluoroethane | 20 |
| Dichlorodifluoromethane | 30 |

The above formulation was packaged in a commercially available tin-plate can with a sprayed-on liner. After six months' shelf testing, corrosion resistance was found to be highly satisfactory.

The process of the present invention achieves the preparation of aluminum complexes which are soluble in anhydrous alcohol and are compatible with Aerosol propellants, and which can be produced at a lower cost than a process which is dependent upon basic aluminum chloride.

The text of patent application Ser. No. 603,133 is incorporated herein by reference.

The present invention may be embodied in other specific forms without departing from the spirit or essential attributes thereof and, accordingly, reference should be made to the appended claims, rather than to the foregoing specification as indicating the scope of the invention.

It is claimed:

1. The method of preparing an inorganic-organic coordinated complex of aluminum comprising forming an aqueous mixture of aluminum metal, a polyhydroxy compound, having at least two carbon atoms, each of which is linked to a hydroxy group, and a chloride compound selected from the group consisting of aluminum chloride and hydrochloric acid, heating said mixture to a temperature of between about 75° C. to 110° C., filtering said mixture, and drying the filtrate by removing water to form a product having from about 1.0 to about 10 weight percent water determined by Karl Fischer analysis, said product being said complex.

2. A method in accordance with claim 1 in which the chloride compound is aluminum chloride.

3. A method in accordance with claim 1 in which the chloride compound is hydrochloric acid.

4. A method in accordance with claim 1 in which the ratio of reactants is maintained to yield a product having the formula:

$$Al_2(H_2O)_{y-pz}(OH)_{6-nx}Cl_n(R)_p$$

wherein R is the coordinating moiety of a polyhydroxy compound having carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

5. A method in accordance with claim 4 in which the ratio of reactants is maintained to yield a product having the formula:

$$Al_2H_2O)_{0.7-1.1}(OH)_{4.9-5.1}(Cl)_{0.9-1.1}$$
$$(1,2 \text{ propylene glycol})_{0.7-1.3}$$

6. A method in accordance with claim 1 in which the filtrate is spray dried at a temperature of between 80° C. and 320° C. at atmospheric pressure.

7. A method in accordance with claim 1 in which the product has a water content of from about 4½ to 8 weight percent determined by Karl Fischer analysis.

8. A method in accordance with claim 1 in which the polyhydroxy compound is propylene glycol.

9. A method in accordance with claim 1 in which the polyhydroxy compound is trimethylol propane.

10. A method in accordance with claim 1 in which the polyhydroxy compound is selected from the group consisting of propylene glycol; 1,1,1-trimethylol propane, 1,3-butylene glycol; glycerine; 2-methyl-2,4-pentanediol; 2,2-dimethyl-1,3-dihydroxy pentane; and butyne-1,4-diol.

References Cited

UNITED STATES PATENTS

| 2,466,445 | 3/1949 | Landau. |
| 2,823,169 | 2/1958 | Brown et al. |
| 2,872,379 | 2/1959 | Neumann et al. |
| 3,359,169 | 12/1967 | Slater et al. |
| 3,420,932 | 1/1969 | Jones et al. |

OSCAR R. VERTIZ, Primary Examiner

H. M. SNEED, Assistant Examiner

U.S. Cl. X.R.

424—68